3,056,459
WELL SCREEN POINTS
Howard O. Williams, Minneapolis, Minn., assignor to Edward E. Johnson, Inc., St. Paul, Minn., a corporation of Minnesota
Filed Mar. 23, 1959, Ser. No. 801,086
5 Claims. (Cl. 175—314)

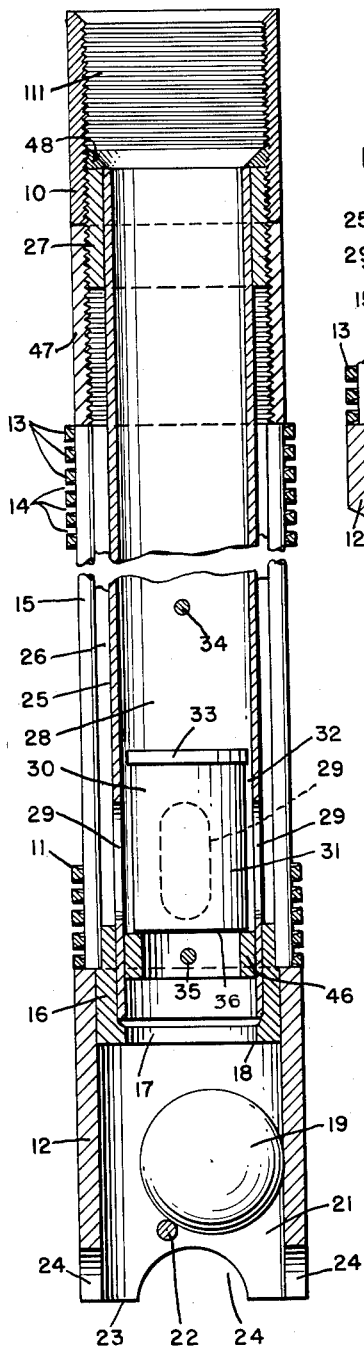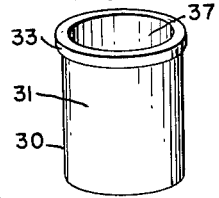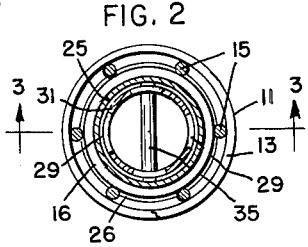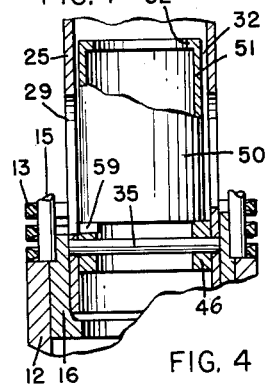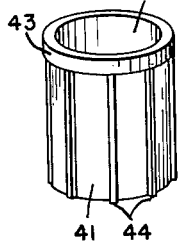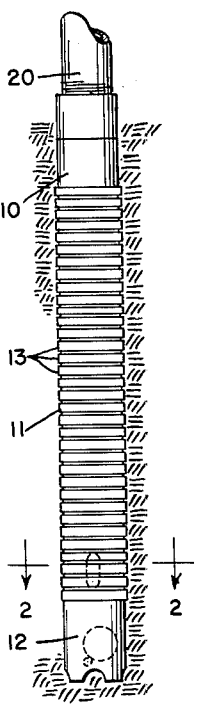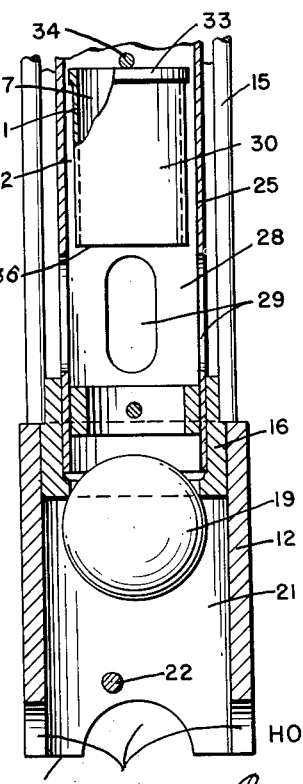
INVENTOR
HOWARD O. WILLIAMS
Caswell & Lagaard
ATTORNEYS United States Patent Office 3,056,459
Patented Oct. 2, 1962

The herein disclosed invention relates to well screen points and has for an object to provide a point adapted for use in dewatering systems for the removal of unwanted water.

Another object of the invention resides in providing a well screen point which may be of the self-jetting type and in which the riser pipe is lowered by the forcing of water through the open end of the well point tip.

A still further object of the invention resides in providing a well screen point in which water under pressure is simultaneously directed through the open tip of the point to procure the jetting action and also through the openings in the well screen proper to prevent the screen from clogging.

Another object of the invention resides in providing the point with an inner tube spaced from the well screen proper to form a passageway therebetween and having openings therein communicating with the lower portion of said passageway for conducting a portion of the water entering said tube through the openings in the screen while the jetting action is in progress.

Another object of the invention resides in providing a reciprocating valve member within the tube having a sleeve adapted to overlie the openings in the tube and spaced from the tube to provide a restricted passageway through which water may enter and flow through the openings in the tube outwardly into the annular space between the tube and the screen proper and through the openings in the screen proper.

A still further object of the invention resides in providing a flange on said valve member extending outwardly toward the tube and serving to move the valve member into flow restricting position upon flow of water in said tube in a downward direction.

Another object of the invention resides in providing a check valve in the tip of the well point for preventing upward flow of water through the tip when water is to be removed.

Other objects of the invention reside in the novel combination and arrangement of parts and in the details of construction hereinafter illustrated and/or described.

In the drawings:
FIG. 1 is an elevational view of a well screen point illustrating an embodiment of the invention.
FIG. 2 is a cross-sectional view of the structure shown in FIG. 1 and taken on line 2—2 of FIG. 1 and drawn to a greater scale.
FIG. 3 is an elevational sectional view taken on line 3—3 of FIG. 2 and showing the valve member in flow restricting position.
FIG. 4 is a fragmentary elevational view similar to FIG. 3 showing the valve member in full open position.
FIG. 5 is a perspective view of the valve member removed from the well screen point.
FIG. 6 is a view similar to FIG. 5 of a modification of the valve member.
FIG. 7 is a fragmentary elevational sectional view similar to FIG. 3 and showing a modification of the invention.

In the lowering of well screen points utilizing the jetting method for the purpose of dewatering, the screen frequently becomes clogged with the material through which the point is driven so that when the water is to be drawn inwardly into the well pipe the openings are clogged and full flow becomes impossible. The instant invention overcomes this objection by diverting some of the water forced into the well pipe for jetting purposes through the screen proper to maintain the openings therein open throughout the lowering of the well point.

The well point forming the subject matter of the instant application for patent consists of a pipe coupling 10 formed with internal threads 111 to receive a riser pipe 20 and a threaded nipple 27, The nipple has attached to the lower end thereof the well screen proper which is indicated by the reference numeral 11. Secured to the lower end of the well screen 11 is a tubular tip 12 having a bore 21 extending therethrough and through which water may be forced to procure the desired jetting action. The lower edge 23 of this tip 12 is formed with serrations 24 forming lateral passageways for the water discharged from the tip and providing cutting edges for the point.

The well screen proper or strainer is in the form of a foraminous shell which is constructed with helices 13 of substantially triangular-shaped wire which is wound in spaced relation to form openings or passageways 14 therebetween and through which the water may pass. These openings are sufficiently narrow to exclude the material in which the water is disposed and function in the customary manner. The helices 13 are welded to spaced rods 15 which in turn are welded to the lower end of a threaded sleeve 47 screwed on the nipple 27 and to the upper end of the tip 12.

The upper end of the tip 12 has secured to it a bushing 16 which has an opening 17 in the lower end of the same and which forms on said end of the bushing a valve seat 18. This seat faces downwardly and is adapted to be engaged by a valve head 19 in the form of a ball. This valve head, when in the position shown in FIG. 4, closes the passage through the opening 17 and prevents upward flow in the tip 12. The valve head 19 is retained within the bore 21 by means of a pin 22 which extends transversely through the tip 12 somewhat above the lowermost edge 23 thereof.

Within the interior of the point is mounted a tube 25 smaller in diameter than the interior of the well screen proper 11 to provide an annular passageway 26 therebetween. This tube is received in the bushing 16 attached to the tip 12 and also in the nipple 27 mounted within the interior of the coupling 10. These parts may be secured together by means of a weld 48 to form a unitary structure and to hold the tube 25 in position. The tube 25 has a bore 28 which communicates with the bore 21 of tip 12 through the opening 17 in bushing 16 when the valve head 19 is disengaged from the valve seat 18. Formed in the wall of the tube 25 are openings 29 which communicate with the passageway 26. These openings are situated at the lowermost portion of the tube and immediately above the bushing 16. Said tube forms conducting means for conducting water from the openings in the shell to the passageway within the riser pipe.

Slidably mounted in the bore 28 of tube 25 is a tubular valve member 30. This valve member is constructed with a sleeve 31 of smaller diameter than the bore 28 of tube 25 to provide a passageway 32 therebetween. This passageway is open at both ends of the sleeve and is constricted at the upper end of the same by means of a flange 33 which extends outwardly from said sleeve and into proximity to the inner surface of the tube 25. The sleeve 31, when the valve member 30 is in the position shown in FIG. 4, clears the openings 29 and allows water to pass through the same and be discharged through the pump connected to the upper end of the riser pipe 20. When, however, the valve member 30 reaches the position shown in FIG. 3, the sleeve 31 lies opposite the openings 29 and water may only enter the passageway 32 from the uppermost portion thereof and flow into the passageway 26. Movement of the valve member 30 is facilitated by constructing the same of polyethelene or some other light weight suitable plastic material. The movement of the valve member 30 is limited by means of a pin 34 which extends transversely through the tube 25 and by means of a bushing 46 disposed in tube 25 and held in place therein by means of a pin 35, said pin 34 and bushing 46 serving as stops engageable with the flange 33 and the lower edge 36 of said valve member.

The method of operation of the invention is as follows: When the well point is to be lowered, water under pressure is forced through the pipe 20 connected to the coupling 10 and into the tube 25 and flows downwardly through said tube. The velocity of water so flowing engages the flange 33 and forces the valve member 30 into its flow restricting position shown in FIG. 3. At the same time, the valve head 19 is forced downwardly and the same disengaged from the valve seat 18. The greater part of the water delivered to tube 25 then flows through the bore 21 of tip 12 and outwardly through the serrations 24 in the edge 23 of said tip. This causes a jetting action which frees the riser pipe 20 and attached structure for downward movement. At the same time a portion of the water passes downwardly through the passageway 32 and out through the openings 29 and into passageway 26. From this passageway the water flows outwardly through the openings 14 in the foraminous jacket 11 forming the well screen proper and serves to prevent extraneous material from entering said openings and clogging the screen while the jetting action is in progress. When the point has been lowered to the area in which the water to be drained is situated, the pumping action at the upper end of the well is reversed and suction applied instead of pressure. Water now flows through the openings 14 in shell 11, into the passageway 26, through openings 29 and into the passageway 32. Upward flow of water in the passageway 32 raises the valve member 31 to the position shown in FIG. 4 and flow in passageway 28 likewise raises the valve head 19. Water now flows freely through the openings 29 and through the bore 37 in the valve member 31. This bore being in communication with the bore 28, conducts the water into the riser pipe where the same is readily removed by the pump. The valve head 19 being drawn upwardly and in engagement with the valve seat 18, prevents water, sand or other extraneous material from passing through the tip 12 and into the riser pipe.

In FIG. 6 is shown a modification of the valve member 30. This valve member herein illustrated is indicated by the reference numeral 40 and has a sleeve 41 and a flange 43 similar to that of the valve member 30. In addition, said valve member has longitudinally extending guides 44 which engage the inner surface of the tube 25 formed by the bore 28 and cause the valve member to travel in parallel relation with respect to said tube. The construction shown in FIG. 6 operates in the same manner as the valve member 31.

In FIG. 7 a modification of the invention has been shown. With the exception of the sleeve valve member, the construction shown in FIG. 7 is the same as that shown in FIG. 3 except that an aperture 59 is formed in bushing 46 bringing passageway 26 into communication with bore 28. This construction will hence not be described again and the same reference numerals used to indicate the identical parts. The valve member shown in this form of the invention is indicated by the reference numeral 50 and has a sleeve 51 and a flange 52 which is situated at the upper portion of said sleeve. In this form of the invention the flange is turned inwardly instead of outwardly and the restriction to the flow of water through the openings 29 and into passageway 26 is procured by making the external diameter of the sleeve 51 suitable for the purpose. The construction shown in FIG. 7 operates in the manner of the form of the invention shown in FIGS. 1 to 5. Water enters the interior of the valve member 50 through the aperture 59 formed in bushing 46 and passing the flange 52 creates a drag on the valve member which raises the same off from the bushing 46. When the water gets under the lower end of said bushing the valve member rises more rapidly until it strikes the pin 34 thus fully opening the valve. The valve being constructed of a plastic material is extremely light and almost floats so that little effort is required to elevate the same.

The advantages of the invention are manifest. The water passing through the screen and tip are proportioned to give the desired jetting action and at the same time the screen is prevented from clogging so that the water removed flows freely through the screen when the jetting action is completed. The valve member employed divides the water so that the screen is maintained open and is automatically moved from jetting position to the pumping position as the pressure in the point is reversed. The construction is extremely simple and may be manufactured at a cost commensurate with the cost of ordinary well screen points used for the purpose.

Changes in the specific form of the invention, as herein described, may be made within the scope of what is claimed without departing from the spirit of the invention.

Having described the invention, what is claimed as new and desired to be protected by letters patent is:

1. In a jet driven de-watering well screen point having coupling means, a foraminous tubular shell serving as a strainer attached at its upper end to said coupling means, a tubular tip at the lower end of said shell and having a discharge opening therein, valve means for changing from jetting action to de-watering action comprising a flow tube within said shell having a bore therein, said tube being permanently and tightly connected at its upper end to said coupling means and extending at its lower end to said tip, said tube being spaced from said foraminous shell to form a passageway therebetween communicating with the openings in said shell, said passageway being closed at its upper and lower ends, a check valve between said discharge opening in said tip and bore of said tube and disposed beneath the lower end of said tube and having a valve seat fixed relative to said tip, said tube having laterally extending openings therein disposed at the lower end thereof and communicating with said passageway and with the bore of said tube, said tube being impervious above said openings and throughout the major extent of said foraminuous shell, said valve means further including a sliding valve member within said tube and having an imperforate sleeve open at its ends and of a length less than the length of said shell, said valve member being disposed within said tube, and normally overlying the openings in said tube and closing said valve means to normally maintain the valve member in a position permitting of maximum jetting action, a radially extending flange on said sleeve disposed at the upper end thereof, means providing a passageway communicating with said first-named passageway and leading up to said flange, said flange serving as a piston and operating to raise said valve member upon application of suction to the upper end of the point above said tube, said valve member having a lower edge movable along said openings in said flow tube and serving to uncover the openings in said tube and control and direct water through said openings and into the upper end of said tube through the bore in said sleeve.

2. In a jet driven de-watering well screen point having coupling means, a foraminous tubular shell serving as a strainer attached at its upper end to said coupling means, a tubular tip at the lower end of said shell and having a discharge opening therein, valve means for changing from jetting action to de-watering action comprising a flow tube within said shell having a bore therein, said tube being permanently and tightly connected at its upper end to said coupling means and extending at its lower end to said tip, said tube being spaced from said foraminous shell to form a passageway therebetween communicating with the openings in said shell, said passageway being closed at its upper and lower ends, a check valve between said discharge opening in said tip and bore of said tube and disposed beneath the lower end of said tube and having a valve seat fixed relative to said tip, said tube having laterally extending openings therein disposed at the lower end thereof and communicating with said passageway and with the bore of said tube, said tube being impervious above said openings and throughout the major extent of said foraminuous shell, said valve means further including a sliding valve member within said tube, and having an imperforate sleeve, open at its ends and of a length less than the length of said shell and normally overlying the openings in said tube and closing said valve means to normally maintain the valve member in a position permitting of maximum jetting action, said valve member being spaced from said tube to form a passageway therebetween communicating with the passageway between said tube and said shell through the openings in said tube, a radial flange on said sleeve at the upper end thereof extending outwardly toward said tube and serving as a piston and operating to raise said valve member upon application of suction to the upper end of the well screen point above said tube, said valve member having a lower edge movable along said openings in said flow tube and serving to uncover the openings in said tube and control and direct water through said openings and into the upper end of said tube through the bore in said sleeve.

3. In a jet driven de-watering well screen point having coupling means, a foraminous tubular shell serving as a strainer attached at its upper end to said coupling means, a tubular tip at the lower end of said shell and having a discharge opening therein, valve means for changing from jetting action to de-watering action comprising a flow tube within said shell having a bore therein, said tube being permanently and tightly connected at its upper end to said coupling means and extending at its lower end to said tip, said tube being spaced from said foraminous shell to form a passageway therebetween communicating with the openings in said shell, said passageway being closed at its upper and lower ends, a check valve between said discharge opening in said tip and bore of said tube and disposed beneath the lower end of said tube and having a valve seat fixed relative to said tip, said tube having laterally extending openings therein disposed at the lower end thereof and communicating with said passageway and with the bore of said tube, said tube being impervious above said openings and throughout the major extent of said foraminuous shell, said valve means further including a sliding valve member within said tube, and having an imperforate sleeve, open at its ends and of a length less than the length of said shell and normally overlying the openings in said tube and closing said valve means to normally maintain the valve member in a position permitting of maximum jetting action, said valve member being spaced from said tube to form a passageway therebetween communicating with the passageway between said tube and said shell through the openings in said tube, a radial flange on said sleeve at the upper end thereof extending outwardly toward said tube and serving as a piston and operating to raise said valve member upon application of suction to the upper end of the well screen point above said tube, said valve member having a lower edge movable along said openings in said flow tube and serving to uncover the openings in said tube and control and direct water through said openings and into the upper end of said tube through the bore in said sleeve and means forming an upwardly facing valve seat on which the lower edge of said sleeve normaly rests and which closes communication between the lower end of said sleeve and the passageway between said sleeve and tube to permit of instantaneous jetting action when pressure is applied to the upper end of said point above said tube, said valve member remaining seated on its seat by gravity when no suction nor pressure is applied to said tip, said last named seat serving as a stop for limiting downward movement of said valve member and a stop for limiting upward movement of said valve member.

4. In a jet driven de-watering well screen point having coupling means, a foraminous tubular shell serving as a strainer attached at its upper end to said coupling means, a tubular tip at the lower end of said shell and having a discharge opening therein, valve means for changing from jetting action to de-watering action comprising a flow tube within said shell having a bore therein, said tube being permanently and tightly connected at its upper end to said coupling means and extending at its lower end to said tip, said tube being spaced from said foraminous shell to form a passageway therebetween communicating with the openings in said shell, said passageway being closed at its upper and lower ends, a check valve between said discharge opening in said tip and bore of said tube and disposed beneath the lower end of said tube and having a valve seat fixed relative to said tip, said tube having laterally extending openings therein disposed at the lower end thereof and communicating with said passageway and with the bore of said tube, said tube being impervious above said openings and throughout the major extent of said foraminuous shell, said valve means further including a sliding valve member within said tube constructed of a light plastic material and having an imperforate sleeve open at its ends, said valve member normally overlying the openings in said tube, a radially extending flange on said sleeve disposed at the upper end thereof, means providing a passageway communicating with said first-named passageway and leading up to said flange, said flange serving as a piston and operating to raise said valve member upon application of suction to the upper end of the point above said tube, said valve member having a lower edge movable along said openings in said flow tube and serving to uncover the openings in said tube and control and direct water through said openings and into the upper end of said tube through the bore in said sleeve.

5. In a jet driven de-watering well screen point having coupling means, a foraminous tubular shell serving as a strainer attached at its upper end to said coupling means, a tubular tip at the lower end of said shell and having a discharge opening therein, valve means for changing from jetting action to de-watering action comprising a flow tube within said shell having a bore therein, said tube being permanently and tightly connected at its upper end to said coupling means and extending at its lower end to said tip, said tube being spaced from said foraminous shell to form a passageway therebetween communicating with the openings in said shell, said passageway being closed at its upper and lower ends, a check valve between said discharge opening in said tip and bore of said tube and disposed beneath the lower end of said tube and having a valve seat fixed relative to said tip, said tube having laterally extending openings therein disposed at the lower end thereof and communicating with said passageway and with the bore of said tube, said tube being impervious above said openings and throughout the major extent of said foraminuous shell, said valve means further including a sliding valve member within said tube constructed of polyethelene and having an imperforate sleeve open at its ends, said valve member being disposed within said tube and normally overlying the openings in said tube, a radially extending flange on said sleeve disposed at the upper end thereof, means providing a passageway communicating with said first-named passageway and leading up to said flange, said flange serving as a piston and operating to raise said valve member upon application of suction to the upper end of the point above said tube, said valve member having a lower edge movable along said openings in said flow tube and serving to uncover the openings in said tube and control and direct water through said openings and into the upper end of said tube through the bore in said sleeve.

References Cited in the file of this patent

UNITED STATES PATENTS

| | | |
|---|---|---|
| 2,093,764 | Lee | Sept. 21, 1937 |
| 2,100,145 | Moore | Nov. 23, 1937 |
| 2,717,040 | Paish | Sept. 6, 1955 |